ately as can be appreciated from a consideration of FIG. 4. The channel-shaped members 13 and 14 include flat bottom walls 15 and 16, respectively, and longitudinally-extend-# United States Patent Office 3,120,937
Patented Feb. 11, 1964

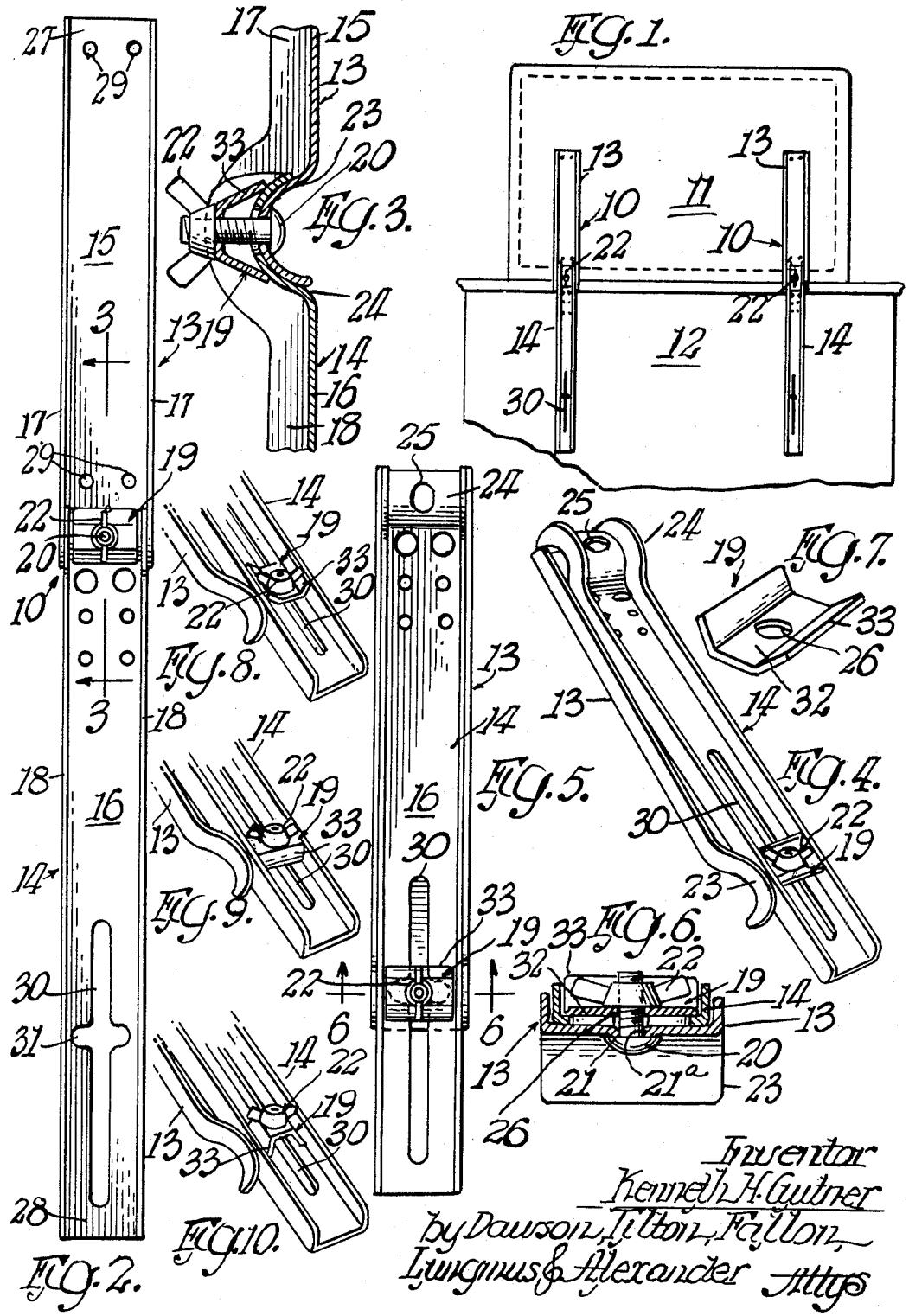

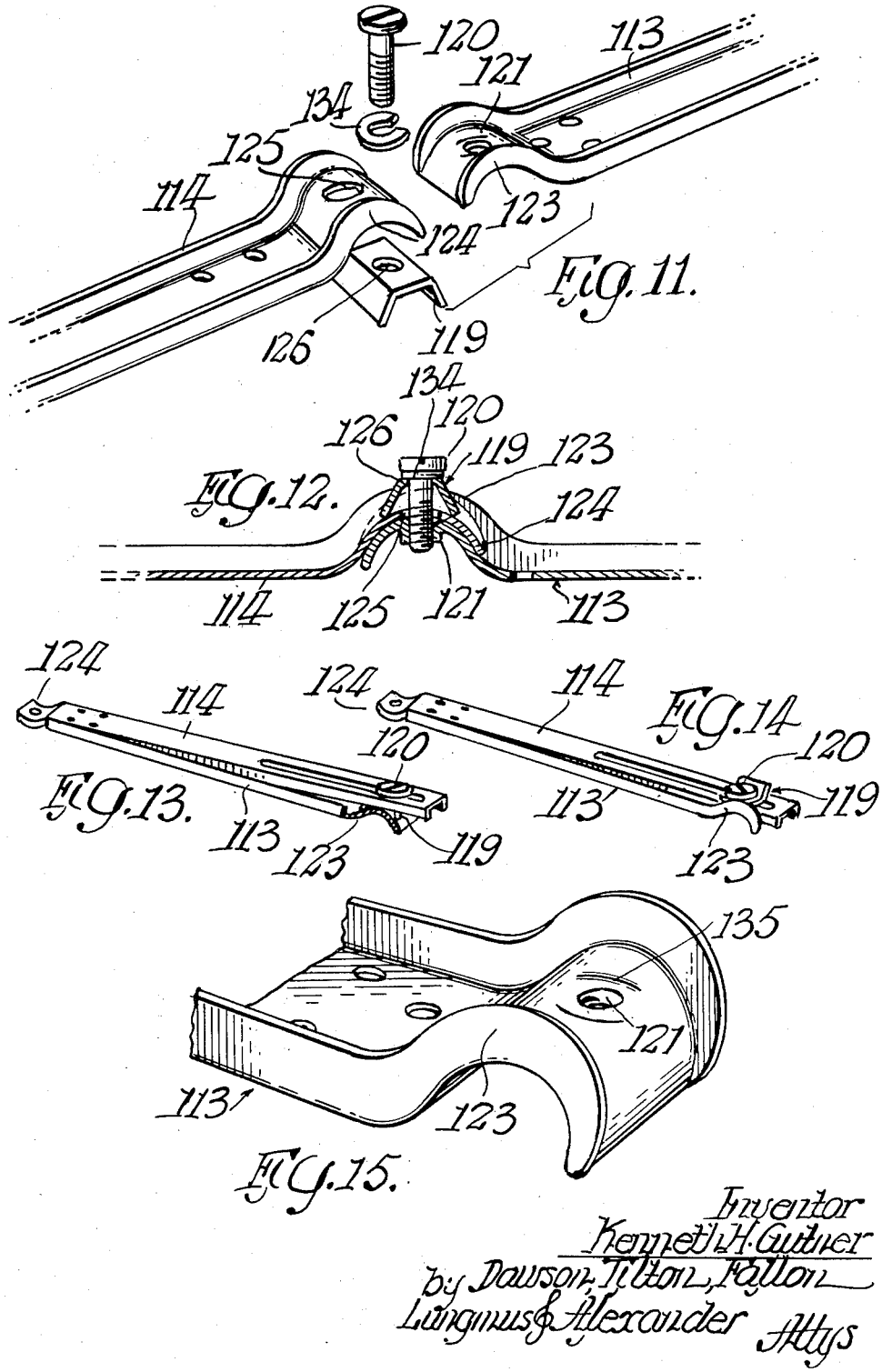

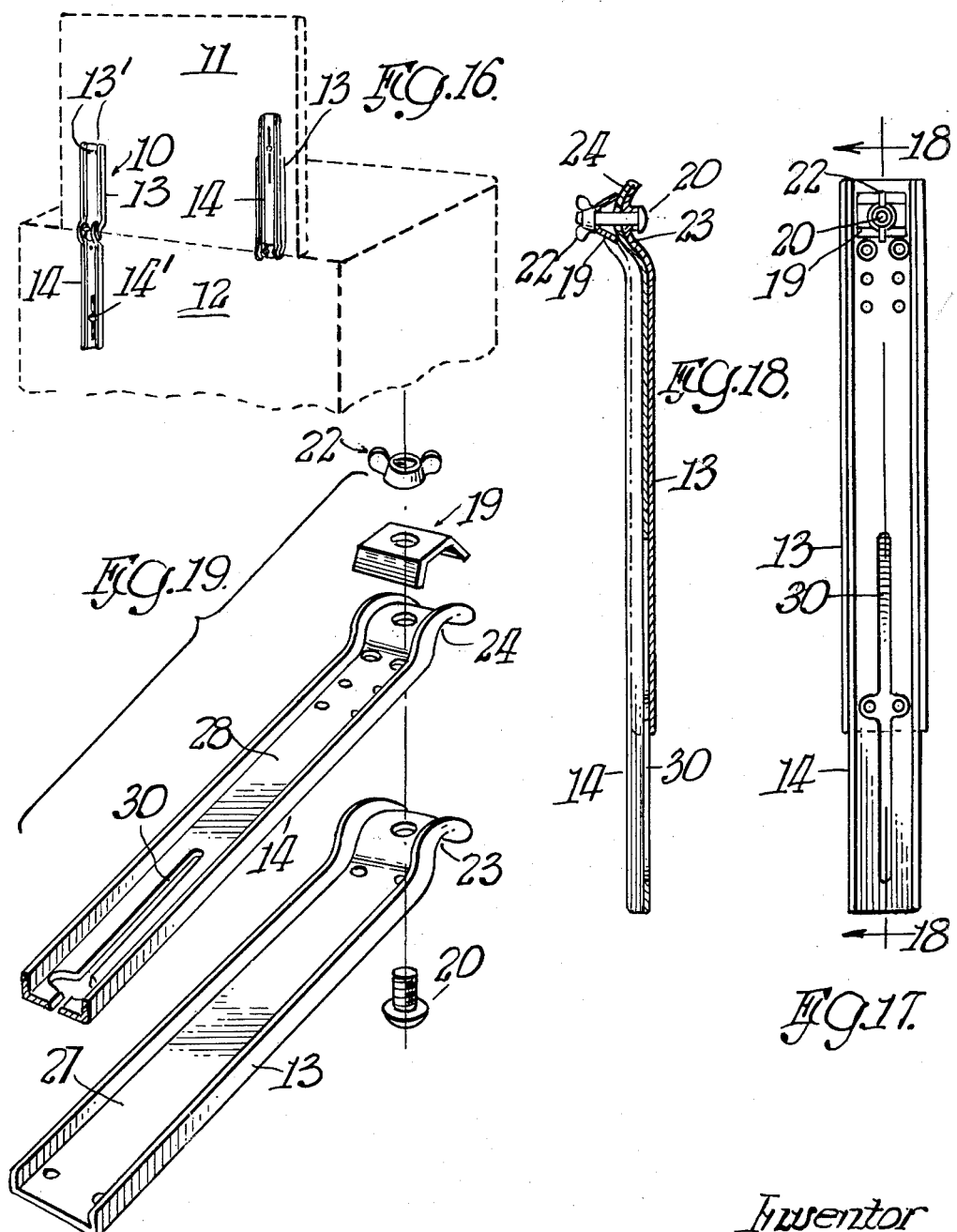

3,120,937
MIRROR BRACKET ASSEMBLY
Kenneth H. Gutner, 591 Roger Williams St.,
Highland Park, Ill.
Filed Jan. 2, 1963, Ser. No. 248,993
4 Claims. (Cl. 248—28)

This invention relates to a mirror bracket, and, more particularly, to an assembled mirror bracket when re-assembled being adapted to support a mirror above a dresser, or the like, for pivotal movement of the mirror about a horizontal axis.

This application is a continuation-in-part of my co-pending application, Serial No. 862,398, filed December 28, 1959, now abandoned.

The provision of mirror brackets or supports, like so many other attachments in the past, has been character-ized by a vexatious problem in that the various operative parts often become lost in shipment between the original manufacturer and the ultimate assembly point. To avoid this, manufacturers of such equipment have had to go to bulky packages which often are space-consuming and the shipment thereof constitutes a substantial portion of the overall cost. It is to be realized that such brackets are relatively inexpensive, so that freight costs can be disproportionate if expensive packaging is involved.

Further, in previous devices of this nature, there have existed problems in assembly. The parts, even though relatively simple in arrangement, still require interfitting, with the possibility of misassembly. This is particularly true when it is considered that ordinarily unskilled labor is employed in the assembly of mirror brackets.

It is, therefore, an object of this invention to provide a mirror bracket assembly which overcomes the draw-backs and disadvantages outlined above.

Another object is to provide a novel mirror bracket characterized by channel construction in the supporting elements, coupled with an arrangement of bolt-receiving openings which permit reversing of the slot-equipped ele-ment for compact shipment of the device prior to as-sembly.

Still another object is to provide a mirror bracket assembly that is arrangeable in two specific orientations of parts, one for shipping and one for installation, the two arrangements being unique and easily distinguish-able so that no mistakes can be made as to the purpose of either arrangement, yet which permits a desirable com-pactness and simplicity in shipment while favoring an efficient operation in the ultimate assembly in a dresser, bureau, etc.

A further object of the invention is to provide a unique interconnection between the supportive members of a mirror bracket whereby a positive, yet simple, lock-ing action is provided. It will be appreciated that in a mirror bracket, the underlying requirement is to make sure that the mirror is properly supported above a dresser. Inopportune loosening of the pivotal connection could not only prove injurious, but harmful. This possibility is materially lessened through the inventive construction.

Other objects and advantages may be seen in the de-tails of operation and construction which are set forth in the following specification.

The invention will be described in conjunction with an illustrative embodiment in the accompanying drawing, in which—

FIG. 1 is an elevational view of a dresser showing the inventive mirror bracket installed in place and support-ing a mirror;

FIG. 2 is an enlarged elevational view of one of the mirror brackets seen in FIG. 1 in the condition of final installation;

FIG. 3 is an enlarged sectional view, taken along the sight line 3—3 of FIG. 2;

FIG. 4 is a perspective view of the mirror bracket ar-ranged in a shipping assembly, i.e., with the parts re-versed to provide a compact form;

FIG. 5 is an elevational view of the arrangement seen in FIG. 4;

FIG. 6 is an enlarged sectional view, taken along the sight line 6—6 applied to FIG. 5;

FIG. 7 is a perspective view of the C-shaped clamping member associated with the construction seen in FIGS. 1–6;

FIG. 8 is a fragmentary perspective view, essentially similar to that seen in FIG. 4, but with the C-shaped clamping member provided in re-oriented position;

FIG. 9 is a fragmentary perspective view similar to that seen in FIG. 4, but with the C-shaped clamping member provided in reversed position;

FIG. 10 is a view similar to FIG. 9, showing the C-shaped clamping member in a re-oriented or realigned position, as contrasted to the showing in FIG. 9, alter-natively reversed relative to the showing in FIG. 8;

FIG. 11 is an exploded perspective view of a modified form of mirror bracket;

FIG. 12 is a sectional view of the mirror bracket of FIG. 11;

FIG. 13 is a fragmentary perspective view showing the elements of the FIGS. 10 and 11 modification assembled for shipment and wherein the inner nestable member is reversed as compared to the showing in FIGS. 4 and 8–10;

FIG. 14 is a view similar to FIG. 13 but with the C-shaped clamping member again located uppermost as in the showings in FIGS. 4 and 8–10;

FIG. 15 is a fragmentary perspective view of the arcu-ate end portion of the mirror bracket member seen in FIG. 10 and enlarged relative thereto;

FIG. 16 is a fragmentary perspective view of a dresser shown in dotted line and with the mirror bracket shown both in the form of shipment and in the form of installa-tion;

FIG. 17 is a top plan view of a mirror bracket package in the arrangement seen in the right-hand portion of FIG. 16;

FIG. 18 is a longitudinal sectional view, taken at the line 18—18 of FIG. 17; and FIG. 19 is an exploded perspective view of the show-ings in FIGS. 17 and 18.

In the illustration given, the numeral 10 designates generally a mirror bracket as installed on a mirror 11 and a dresser 12 (see FIG. 1).

Each bracket 10, as seen from FIG. 2, includes a wider member generally designated 13 and a narrower member generally designated 14, both of which are elongated metal members having a general channel shape, as can be appreciated from a consideration of FIG. 4. The channel-shaped members 13 and 14 include flat bottom walls 15 and 16, respectively, and longitudinally-extend-ing, upstanding side walls 17 and 18.

The numeral 19 (see FIG. 7) generally designates a clamping element having a C shape, which is superposed on the narrower member 14 (see FIG. 3). The numeral 20 designates a threaded bolt staked as at 21a into an opening 21 of the member 13 to secure the parts 13, 14 and 19 together in combination with a wingnut 22.

Each member 13 and 14 is characterized by an arcuate or cylindrical portion at one end thereof. The cylindrical portion in the member 13 is designated 23, and it is in the portion 23 that the bolt 20 is mounted. The portion 23 is seen to be arcuate in a longitudinal direction, i.e., the axis of the cylindrical portion is transverse of the length of the member 13. A correspondingly longitudinally arcuate or cylindrically-shaped portion 24 is provided in the member 14.

The cylindrical portion 24 of the dresser member 14 is equipped with an elongated slot 25 (see FIG. 5) which extends parallel to the longitudinal dimension of member 14. The clamping element 19 is equipped with a bolt-receiving opening 26 (see FIG. 7).

In the operation of the device as an installation on a dresser, the bolt 20 is staked in the opening 21 of the member 13 and thereafter inserted through the slot 25 and the slot 26, after which the wingnut is threadedly received thereon. In this case, the flat ends 27 and 28 (see FIG. 2) are opposed, so that the arcuate end portions 23 and 24 are superposed.

During shipment prior to installation, the members 13 and 14 may be advantageously assembled as seen in FIGS. 4–6. There, it is seen that the arcuate portions 23 and 24 are not superposed, but that the portion 24 is superposed on the flat portion 27 of the wider member 13. The narrower member 14 is equipped with a longitudinal slot 30, which is transversely widened as at 31. In the embodiment seen in FIGS. 4–6, the flat portion 32 of the C-shaped element 19 is positioned over the transverse widened portion 31, thereby providing an advantageous stabilization.

When the bracket 10 is assembled for shipment, the member 13 may be temporarily or permanently secured to the back of the mirror 11 by the use of suitable wood screws extending through the openings 29.

In the embodiment seen in FIG. 8, the C-shaped clamping element 19 is re-oriented relative to the position seen in FIGS. 4–6 so that the wing end portions 33 extend longitudinally of the nested members, while in FIGS. 9 and 10 the element 19 is reversed relative to the positions seen in FIGS. 4 and 8, respectively. In any case, the element 19 bears against the flat bottom wall 16 of the member 14, the difference being in what portion of the element 19 bears against the bottom wall 16. In FIGS. 4 and 8, it is the flat portion 32, while in FIGS. 9 and 10 it is the wing portion 33. It will also be appreciated that the element 19 may be interposed in any one of the same four positions between the members 13 and 14, i.e., in contact also with the cylindrical portion 23.

Still further, during the course of assembly, there is no way to mount the elements improperly. The member 14 is narrower than the member 13, and therefore can only be superposed thereon. Further, the curvature of the upper or inner cylindrical surface 23 is about the same as the curvature of the lower outer surface of the cylindrical portion 24.

Referring now to FIG. 11, there is seen a modified form of bracket which differs primarily from that seen in FIGS. 1–9 in the method of securing the various parts together. The exploded view seen in FIG. 11 and the assembled form seen in elevation in FIG. 12 include the narrower, longer dresser member 114 and the shorter wider mirror member 113. As before, a clamping element 119 is povided and a bolt 120 extends through an opening 126 in the clamping element 119 and enlarged opening 125 in the member 114 and is threadedly received within a threaded opening 121 in the cylindrical portion 123 of the wider member 113. Additionally, the bolt 120 is equipped with a lock washer 134, and the curved portion 123 of the mirror member 113 is longitudinally deformed or beaded as at 135 to provide a superior anchorage for the bolt 120 as well as to strengthen the curved portion 123.

In FIGS. 13 and 14, an alternate form of nesting the mirror and dresser members 113 and 114 is seen, wherein the bottom wall is faced upwardly—as contrasted to the nested assemblies seen in FIGS. 4 and 8–10. In FIG. 13, the clamping element 119 is interpositioned between the members 113 and 114, while in FIG. 14, the element 119 is positioned above the narrower member 114. It will be seen, however, that in every case the clamping element 119 bears against the narrower member 114, and in the embodiments seen in FIGS. 13 and 14 there is available the reversing and re-orientation of the clamping element 119 described relative to FIGS. 4 and 8–10.

In FIG. 16, the numeral 10 again designates generally the installed mirror bracket, this being screwed or otherwise secured to the mirror 11 and the dresser 12. As before, the mirror element is designated 13 and the dresser element 14.

The arrangement of the elements 13 and 14 during shipment and prior to final installation is shown in the right-hand portion of FIG. 16, where the member 14 is in nested relation with the member 13. The member 13 has been screwed to the mirror 11 by means of screws 13′ (seen only in the left-hand portion of FIG. 16). The dresser member 14, during this shipment stage, is arranged as seen in FIGS. 17 and 18, wherein the arcuate portions 23 and 24 of the elements 13 and 14 are in contacting relation and wherein the other ends as at 27 and 28 are superposed. As before, the dresser element 14 is maintained temporarily in this position by means of the cooperation of the bolt means which, as seen in FIG. 19, includes bolt 20, C-shaped element 19, and wingnut 22.

In operation, the assembly such as is seen in FIGS. 17–19 is shipped from the bracket manufacturer to the furniture manufacturer. Thereafter, and while the assembly is in this form, it may be secured to the rear of a mirror as seen in the right-hand portion of FIG. 16. Once the mirror and dresser are at the site of final installation, it is only necessary to reverse the position of the dresser member through removal of the wingnut 22 or bolt 134 (if the version of FIG. 12 is employed), and then secure the dresser element 14 in the position seen at the left-hand side of FIG. 16, screws 14′ being employed for this purpose, two being used at the upper end of the member 14 and the designated screw 14′ being employed in conjunction with a washer and passing through the slot 30.

While in the foregoing specification I have set forth a detailed description of the invention for the purpose of illustration thereof, many variations in the details herein given may be made by those skilled in the art without departing from the spirit and scope of the invention.

I claim:

1. An elongated mirror bracket assembly adapted to support a mirror above a dresser, and the like, for pivotal movement about a horizontal axis, comprising:

a pair of elongated rigid members each having a bottom wall and upstanding, longitudinally-extending side walls defining channel shapes in transverse section, one of said members being narrower than the other, whereby said members are nestable, each of said members being equipped with an upstanding pivotal portion at one end thereof for hingedly connecting said members, aligned bolt-receiving openings in said pivotal end portions, each member having mounting holes in its bottom wall for mounting said member on a support surface, and a bolt removably mounted in said aligned openings for hingedly connecting the pivotal portions of said members when said members are in an operative position with the other ends of said members being at opposite ends of the assembly whereby said members can be changed to an operative position in which the members are fastened together in aligned relation with only the pivotal end portions overlapping from a shipping position in which the members are secured together in a nested position with one on top of the other and the other ends of said members being generally superposed, the other member bottom wall being below its upstanding pivotal portion and adapted for flat mounting on a mirror flat support surface in either of the aforesaid positions.

2. The assembly of claim 1 in which said bolt is equipped with washer means for urging said upstanding pivotal portions into contacting relation for immobilizing said members in a selected pivotal relationship.

3. The assembly of claim 2 in which said washer means includes an aperture C-shaped clamping element in contact with said narrower member, said narrower member having its bolt opening longitudinally elongated with said upstanding pivotal portions being longitudinally arcuate portions in the bottom walls of said members.

4. The assembly of claim 3 in which the other end of each member is equipped with a flat bottom wall, said members in said shipping position having the flat bottom wall end of said narrower member positioned over the upstanding pivotal portion of the other member bottom wall, said bolt, when said members are in said shipping position, extending through one of said narrower member mounting holes and the pivotal end portion opening of said other member.

References Cited in the file of this patent
UNITED STATES PATENTS

| | | |
|---|---|---|
| 1,861,148 | Withrow | May 31, 1932 |
| 2,904,290 | Mullen | Sept. 15, 1959 |
| 2,923,506 | Simons | Feb. 2, 1960 |
| 2,999,660 | Kurtz | Sept. 12, 1961 |